United States Patent
McGuire et al.

(10) Patent No.: US 7,061,639 B2
(45) Date of Patent: Jun. 13, 2006

(54) APPARATUS AND METHOD FOR SCANNING A COPY JOB WHEN A PRINT PATH IS NOT AVAILABLE

(75) Inventors: Theresa L. McGuire, Meridian, ID (US); Chris R. Gunning, Boise, ID (US); Daniel A. Donegan, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 860 days.

(21) Appl. No.: 09/940,781

(22) Filed: Aug. 27, 2001

(65) Prior Publication Data

US 2003/0038998 A1     Feb. 27, 2003

(51) Int. Cl.
*G06K 15/00* (2006.01)

(52) U.S. Cl. .................. 358/1.16; 358/413; 358/437

(58) Field of Classification Search ............... 358/1.14, 358/400, 401, 1.15, 1.3, 474, 476, 501, 408, 358/413, 437, 1.6, 1.12, 1.18
See application file for complete search history.

(56) References Cited

U.S. PATENT DOCUMENTS

| | | | |
|---|---|---|---|
| 3,821,931 A | 7/1974 | Yamaji et al. | |
| 4,754,300 A | 6/1988 | Fukae | |
| 4,947,345 A | 8/1990 | Paradise et al. | |
| 4,959,731 A | 9/1990 | Fukae | |
| 5,459,579 A | 10/1995 | Hu et al. | |
| 5,511,150 A | 4/1996 | Beaudet et al. | |
| 6,026,258 A | 2/2000 | Fresk et al. | |
| 6,160,629 A | 12/2000 | Tang et al. | |
| 6,266,152 B1 * | 7/2001 | Nakajima | 358/1.9 |
| 6,421,135 B1 * | 7/2002 | Fresk et al. | 358/1.15 |
| 6,469,795 B1 * | 10/2002 | Beaudet et al. | 358/1.14 |

FOREIGN PATENT DOCUMENTS

| GB | 2284319 A | 5/1995 |
|---|---|---|
| GB | 2349767 A | 11/2000 |

* cited by examiner

*Primary Examiner*—Jerome Grant, II

(57) ABSTRACT

A device and method of scanning a job on a document-processing device when a print path is not available. The method includes initiating a job and determining that a printer job channel is not available. The method further includes scanning the job and spooling the job to a mass storage device. The method also includes storing the job in the mass storage device until the printer job channel becomes available.

16 Claims, 4 Drawing Sheets

APPARATUS AND METHOD FOR SCANNING A COPY JOB WHEN A PRINT PATH IS NOT AVAILABLE

FIELD OF THE INVENTION

The present invention relates generally to document-processing devices, and more particularly to a device and method for scanning a job on a multi-functional document-processing device when a print path is temporarily not available.

BACKGROUND

In recent years, many offices have exchanged their copiers, printers, facsimile machines, scanners, etc. for a single document-processing device that is able to support multiple functionalities. For example, offices may replace the typical facsimile machine, walk-up copier, scanner, and individual network printers, with a single machine, referred to as a multi-functional document-processing device or a Mopier®.

Such multi-functional document-processing devices are capable of facilitating multiple users. However, each user must wait for their turn, thereby causing some users to wait before they can use the device. For example, since a typical multi-functional document-processing device has only one print engine, the device can only produce one print output at a time. In other words, only one job may be sent through a print path at a time. Thus, a walk-up copier user who wishes to use the scanning and copying functions available on the device must wait until the device has completed other tasks, such as printing a print job, before the walk-up user may begin scanning the pages of their copy job. A large print job may engage the device for a long period of time and may cause a backlog of operators waiting for their turn to copy on the device. Similarly, when the device is warming up in preparation to print a job or is in a power-save mode, a walk-up copier user must wait for the device to complete its warming-up process prior to being able to scan a document.

Some document-processing devices are known which use a memory buffer to permit a user to scan their copy job into the device when the printer portion of the device is engaged in a different print job. These buffers are generally temporary storage areas that are limited in size. A typical buffer can temporarily store only a few scanned images. Thus, a walk-up user who wishes to scan a copy job while the printer portion of the device is occupied may be able to scan a few pages of their copy job. However, the walk-up user who has a large copy job, which cannot be stored in the buffer, must wait for printer portion of the device to become available.

Furthermore, multiple print jobs submitted through the network may frustrate walk-up users waiting for the printer portion of the device to become available. For example, a network user may submit a first print job to the network printer portion of the device and during the process of printing the first print job, a walk-up user may walk-up to the same device in the hopes of completing a large copy job. If the buffer is not large enough to store the copy job, the walk-up user must wait for the first print job to be completed. The walk-up user may also have to wait for print jobs submitted from a network during the printing of the first print job. Thus, if, while the walk-up user is waiting, a second and third print job are submitted to the device, then the walk-up user must now wait for not only the first print job, but also the second and third print job, and any queued print jobs.

SUMMARY OF THE INVENTION

The present invention is directed to a document-processing device that is configured to concurrently scan a first job and print a second job. The present invention is also directed to a method of scanning a job on a document-processing device when a print path is not available. In one embodiment, the method includes initiating a job, determining that a printer job channel is not available and scanning the job, spooling the job to a mass storage device, and storing the job in the mass storage device until the printer job channel becomes available. The status of the printer job channel may be periodically checked to review whether the printer job channel is available. When the printer job channel is available, the job may be automatically retrieved from the mass storage device and sent through the print path.

DETAILED DESCRIPTION OF THE INVENTION

Figure 1:
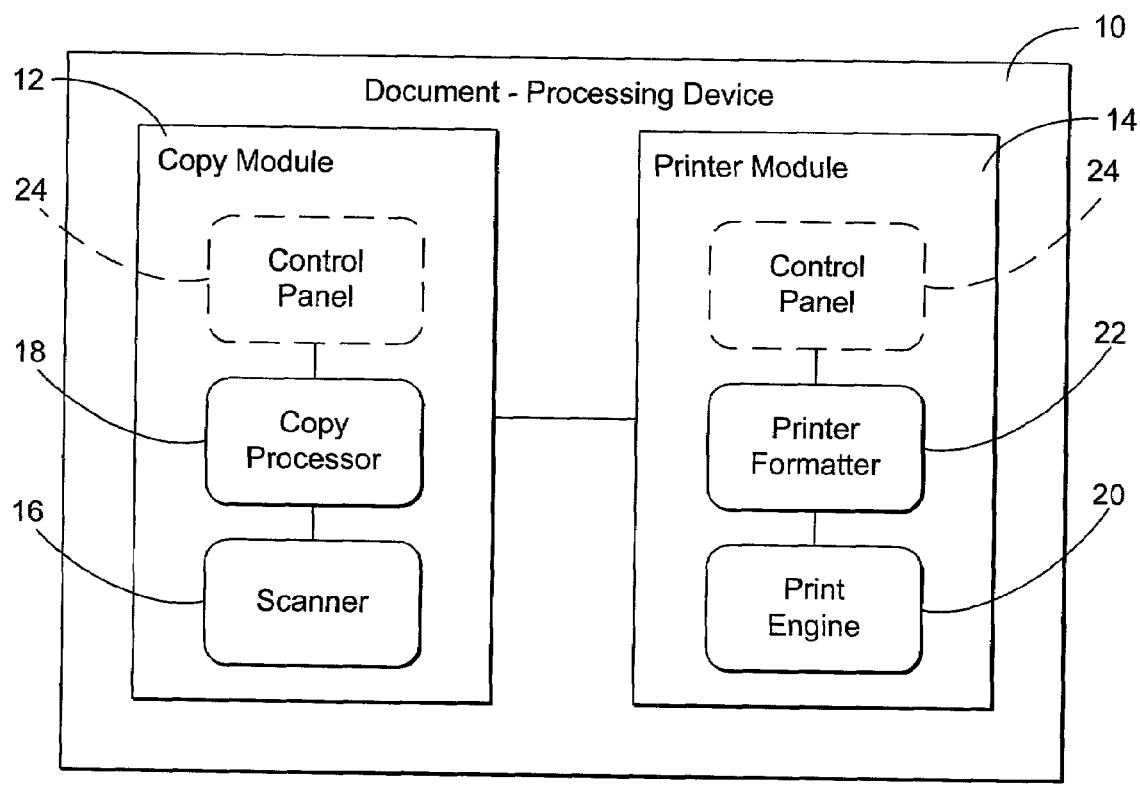
FIG. 1 is a schematic representation of a multi-function document-processing device in accordance with one embodiment of the present invention.

Referring initially to FIG. 1, a multi-function document-processing device according to one embodiment of the present invention is shown generally at 10. Document-processing device 10 is configured such that a copy job can be scanned even if a print path is not available. Document-processing device 10 typically includes a copy module 12 and a printer module 14. Copy module 12 may include a scanner 16 and a copy processor 18. Printer module 14 may include a print engine 20 and a printer formatter (also referred to as a controller) 22.

As used herein, copy module 12 refers to an apparatus which may be configured to scan images of an original hard copy document. A hard copy document is a document which exists physically on paper or other suitable media. An original hard copy document is a document that is to be reproduced or copied. Printer module 14, as used herein, is an apparatus that may be configured to receive electronic image information from either copy module 12 or from any linked device capable of transmitting an electronic document. Printer module 14 may be further configured to reproduce and print the electronic image information into one or more hard copy reproductions. The hard copy reproductions are the physical print output of printer module 14.

Document-processing device 10 may be capable of completing both copy jobs, scan jobs and print jobs. Jobs, as used herein, refers generally to copy jobs, scan jobs, print jobs, and other suitable jobs sent to the device. A copy job refers generally to the operation of document-processing device 10 to produce one or more hard copy reproductions of an original hard copy document. The copy job may include a scan job. A walk-up user may initiate a copy job. A print job refers generally to the operation of document-processing device 10, as a conventional printer, to produce one or more hard copy reproductions of an electronic document.

A print job may be initiated remotely through a linked computer. The computer may be coupled to document-processing device 10 through any suitable interface. Document-processing device 10 and/or printer module 14 may be capable of receiving an electronic document transmitted from the linked computer through the interface. Once the electronic document is received by document-processing device 10, printer module 14 may be configured to print a hard copy reproduction of the electronic document.

A user may control operation of document-processing device 10 remotely from a linked computer or locally through the device. For example, as shown in FIG. 1, a control panel 24 may be located on document-processing device 10. Control panel 24 may be on copy module 12, on printer module 14, or on both. The control panel, regardless of location, may be configured such that a walk-up user of document-processing device 10 may initiate a copy job, define attributes of a copy job, and/or terminate a copy job. A user may also initiate a copy job by triggering a media sensor on document-processing device 10. For example, placing the original hard copy on the device may operate to initiate a copy job.

Initiation of a copy job includes scanning an original hard copy document. As shown in FIG. 1 and described briefly above, copy module 12 includes a scanner 16 and a copy processor 18. Scanner 16 is configured to scan an original hard copy document into scanned electronic images. Copy processor 18 manages and controls scanner 16, and the scanned images resulting from scanning the original hard copy document.

Figure 2:
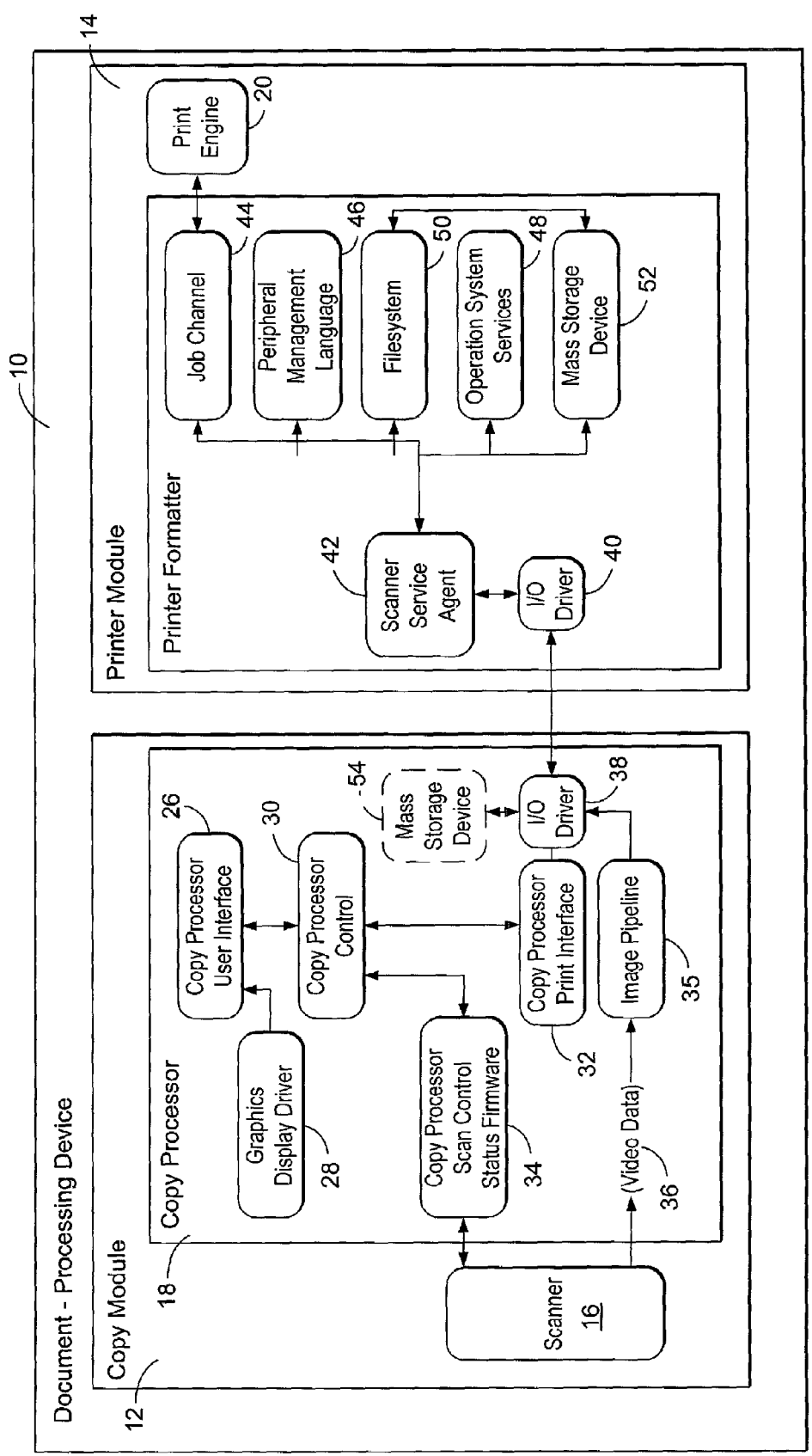
FIG. 2 is a schematic representation of the device depicted in FIG. 1, showing a copy processor and printer formatter in detail.

Referring to FIG. 2, copy processor 18 has multiple components. In particular, copy processor 18 includes a copy processor user interface 26 that may send and receive user input received from control panel 24 (shown in FIG. 1). A graphics display driver 28 may be linked to copy processor user interface 26. The copy processor user interface sends user input through to copy processor control 30.

Copy processor control 30 directs the process of scanning including processing the image data received from scanner 16 and sending the image data via copy processor print interface 32 to printer module 14. Copy processor control 30 may also send scanner status reports to the control panel or other suitable user interface via copy processor user interface 26.

Scanner 16 is controlled by a copy processor scan control and status firmware 34, which directs scanner 16 to perform a scan with user-inputted parameters. As described above, copy processor control 30 directs the image data from scanner 16 to printer module 14 via copy processor print interface 32. Copy processor print interface 32 may convert requests from other copy processor components into a form understood by printer formatter 22 (shown in FIGS. 1 and 2).

Copy processor 18 may also include image pipeline firmware 35 that processes video data 36 from scanner 16. Image pipeline firmware 35 prepares the image data for printing. For example, the image data may be filtered, compressed, and/or converted such as to prepare the data for print engine 20 in printer module 14.

Similar to copy processor 18, printer formatter 22 also has multiple components. Copy processor 18 communicates and transfers image data and printer status information via input/output drivers 38 and 40. A scanner service agent 42 resides within printer formatter 22 and receives and processes commands and status data from copy processor 18. Agent 42 may translate copy job control and image data into a page description language data stream that can be sent to printer job channel component 44 which provides access to print engine 20 via a printer job channel.

Other printer formatter components may include a peripheral management language component 46 that may be used by control processor board 18 to determine printer module 14 status. There also may be operation system services firmware 48 and a file system component 50.

File system component 50, or other suitable component within printer formatter 22, may provide access to a mass storage device 52 which may store scanned image data prior to being sent through the print path of printer module 14. Alternatively, in another embodiment, mass storage device 52 may be located on copy processor 18 (as shown in dashed lines at 54). Thus, mass storage device 52 may be integrated with the copy processor and/or the printer formatter.

Scanned images of a job may be spooled to mass storage device 52 such that a walk-up user can initiate a copy job and begin scanning a copy job when printer module 14 is engaged in a different task. Spooling, as used herein, refers to directing a job to a mass storage device where the job may be stored until printer module 14 is available. The mass storage device provides a temporary waiting station for the scanned image data. When printer module 14 completes a prior job, the scanned image data may be retrieved and printed. Multiple jobs may be directed to the mass storage device and queued according to the priority system being used. In other words, the use of mass storage device 52 permits a user to scan a copy job when printer module 14 is already in use printing a different job.

Mass storage device 52 may be non-volatile memory, such as a storage disk (e.g. hard disk, floppy disk, optical disk), flash ROM, magnetic tape drives, magnetic disks, etc. Alternatively, mass storage device 52 may be volatile memory, such as a RAM disk or a block of memory allocated from system RAM. Unlike a memory buffer, which can only hold a few scanned images, mass storage device 52 may store any number of scanned images, and is limited only by the size of the mass storage device (such as the size of the disk). Hence, a multiple-page copy job may be spooled and stored within the mass storage device, but would not be able to be stored within a memory buffer. Similarly, a memory buffer may be only able to store a single small job, but a mass storage device may be able to hold multiple large jobs.

In operation, device 10 permits a walk-up user to initiate a copy job regardless of the status of printer module 14. Upon initiation of a copy job, copy processor 18 may request the availability of a printer job channel and thus, the status of printer module 14 and access to print engine 20. A printer job channel, as used herein, is the communication path through which jobs are sent to the print engine of a printer. Typically, a printer has only one printer job channel because a print engine can only print one document at a time. Thus, the availability of the printer job channel depends on whether the print engine is actively printing a job.

As described above, a request for a printer job channel is sent to scanner service agent 42 via copy processor control 30 and copy processor print interface 32. Scanner service agent 42 then may request a printer job channel from the printer job channel component 44. If a printer job channel is available, then the scanned images are directed through the printer path and are printed by print engine 20 of printer module 14.

A printer job channel is available when printer module 14 is not otherwise engaged. For example, printer module 14 may be otherwise engaged when printer module 14 is already printing another copy job, where printer module 14 is printing a print job sent from a linked computer, or where printer module 14 is warming up to prepare to print a job. Thus, when print engine 20 is printing a prior queued job, there is no print channel available and the printing of the subsequent copy job or print job is delayed until the prior job has been completely printed.

The status of the availability of a printer job channel (and access to the print path and print engine) is transferred from job channel component 44 to copy processor 18 via scanner service agent 42 and input/output drivers 38 and 40. The input/output drivers direct status and job data to and from scanner service agent 42.

Figure 3:
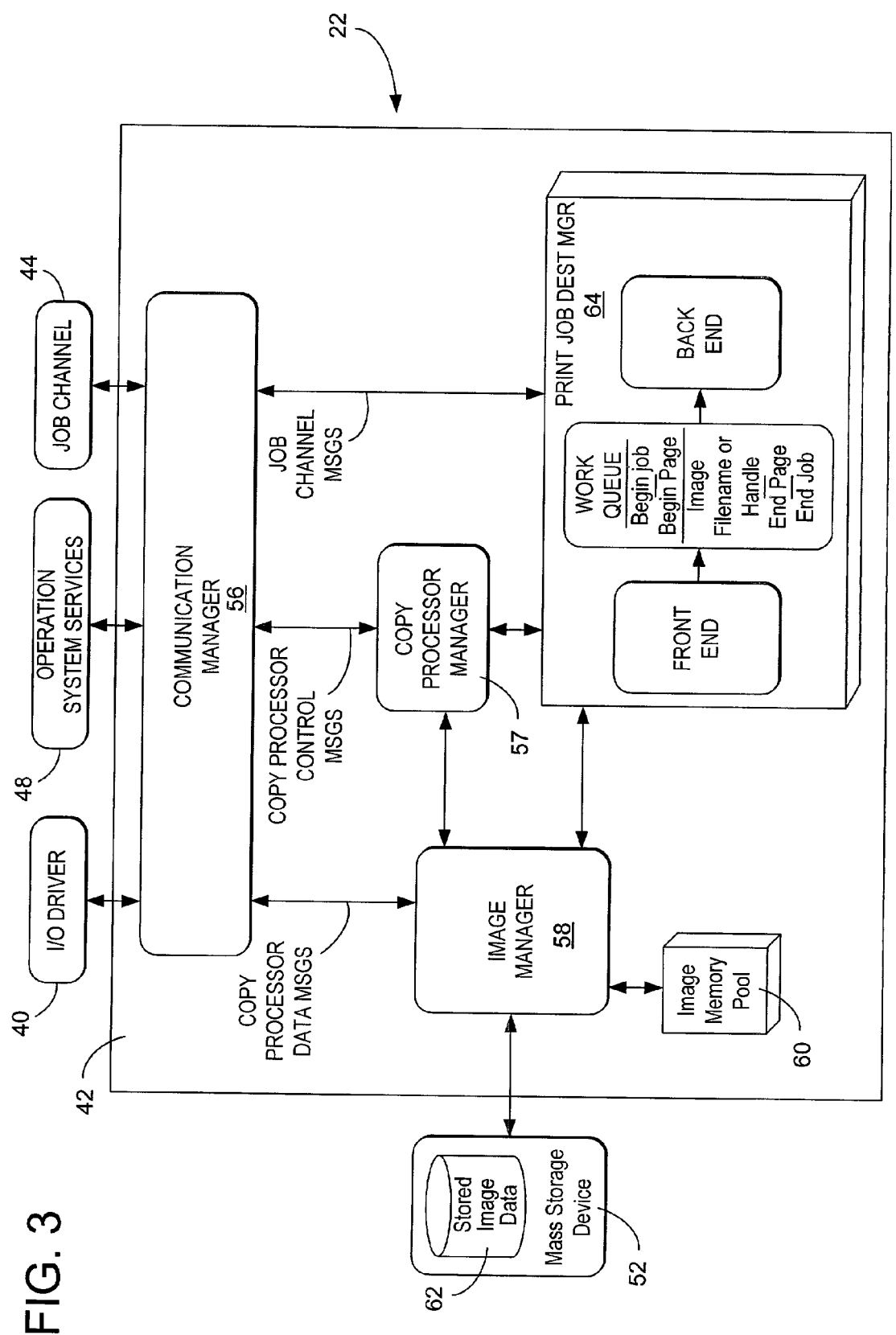
FIG. 3 is a schematic representation of the printer formatter depicted in FIG. 1, showing a scanner service agent in detail.

FIG. 3 shows scanner service agent's architecture in greater detail. In particular, scanner service agent 42 includes a communication manager 56 that is linked directly to input/output driver 40. Communication manager 56 may send and receive image data and status information from printer module 14 or copy module 12. For example, communication manager 56 may send and receive copy processor messages, job channel messages, system messages, and scanned image data. Communication manager 56 may then direct the messages and data to other managers. For example, copy processor control messages sent by copy processor control 30 may be directed by communication manager 56 to a copy processor manager 57. Job channel messages may be directed to print job destination manager 64. Similarly, communication manager 56 may direct image data to an image manager 58.

Image manager 58 may direct the scanned images to the appropriate destination dictated by the availability of a printer job channel. Thus, scanned image data may be routed from the input/output driver 40 through the communication manager 56 to image manager 58 which then may direct the images accordingly. As shown, image manager 58 may manage an image memory pool 60 which is typically sized to hold a few (2–4) letter-sized pages. When image manager 58 receives a request to receive an image, it may transfer control of enough memory from image memory pool 60 to input/output driver 40 to receive image data from copy processor 18. After input/output driver 40 receives the image data, the memory and image data are directed to image manager 58. If a printer job channel is available (as communicated via communication manager 56 and/or job channel component 44), then image manager 58 may receive an image request from a print job destination manager 64. Image manager 58 may then transfer the scanned images from image memory pool 60 to print job destination manager 64. Print job destination manager 64 wraps the images with the appropriate instructions and transfers them to the available printer job channel via communication manager 56 and job channel component 44 for printing by print engine 20 (shown in FIGS. 1 and 2). The printer job channel provides access to the print path and print engine.

If a printer job channel is not available, then a walk-up user may be notified via a control panel (as shown at 24 in FIG. 1) and asked whether the user wants to proceed with scanning the copy job. The user may want to terminate the copy job and hold off scanning until the printer job channel becomes free. Alternatively, the user may want to proceed with scanning the copy job. If the user decides to proceed with scanning, device 10 is configured to permit the copy job to be scanned without interrupting the prior print job from printing. The scanned copy job images are stored in a mass storage device until the printer job channel becomes available and the prior print job is completed.

In one embodiment of the invention, as described above, the copy job is scanned upon a user's directive and the scanned images are spooled via image manager 58 to mass storage device 52 for printing after the job channel becomes available. In another embodiment, image manager 58 may spool the scanned images to mass storage device 52 without requesting input from the user and, thus, automatically route the scanned images to mass storage device 52 when the printer job channel is unavailable. Image manager 58 then may retrieve the spooled images 62 from mass storage device 52 when the printer job channel becomes available. The status of the printer job channel may be communicated to image manager 58 via communication manager 56 or print job destination manager 64.

The spooling to mass storage device 52 may occur via image manager 58 which directs the scanned image data from image memory pool 60 to mass storage device 52. In another embodiment, the spooling of the scanned images is managed by print job destination manager 64. The spooling process may be repeated for as many pages as the user has to scan. Stored image data 62 may then be maintained within mass storage device 52 until a job channel becomes available and the printer is ready to print the stored scanned images. Once the printer job channel becomes available, the spooled images may be retrieved and directed through the print path without any further user input.

Print job destination manager 64 may notify image manager 58 that a printer job channel is available and that it is ready to receive stored image data 62. Print job destination manager 64 in turn may receive a memory pointer from image manager 58 to stored image data 62 or may receive a file descriptor from image manager 58 or other suitable manager indicating the location of stored image data 62. Thus, image manager 58 may retrieve stored image data 62 and transfer the stored image data to print job destination manager 64. In retrieving stored image data 62, image manager 58 may utilize image memory pool 60 to enable the transfer of the scanned data images from mass storage device 52 to print job destination manager 64. The rest of the process may be the same as if the data had never been spooled. Thus, once stored image data 62 is retrieved from mass storage device 52, the data may be routed by image manager 58 to print job destination manager 64. Print job destination manager 64 may then wrap the scanned image data with the appropriate instructions, and transfer it to the available job channel. Print job destination manager 64 operates the same regardless of whether the data was spooled to mass storage device 52 or sent directly via image memory pool 60 and image manager 58.

Figure 4:
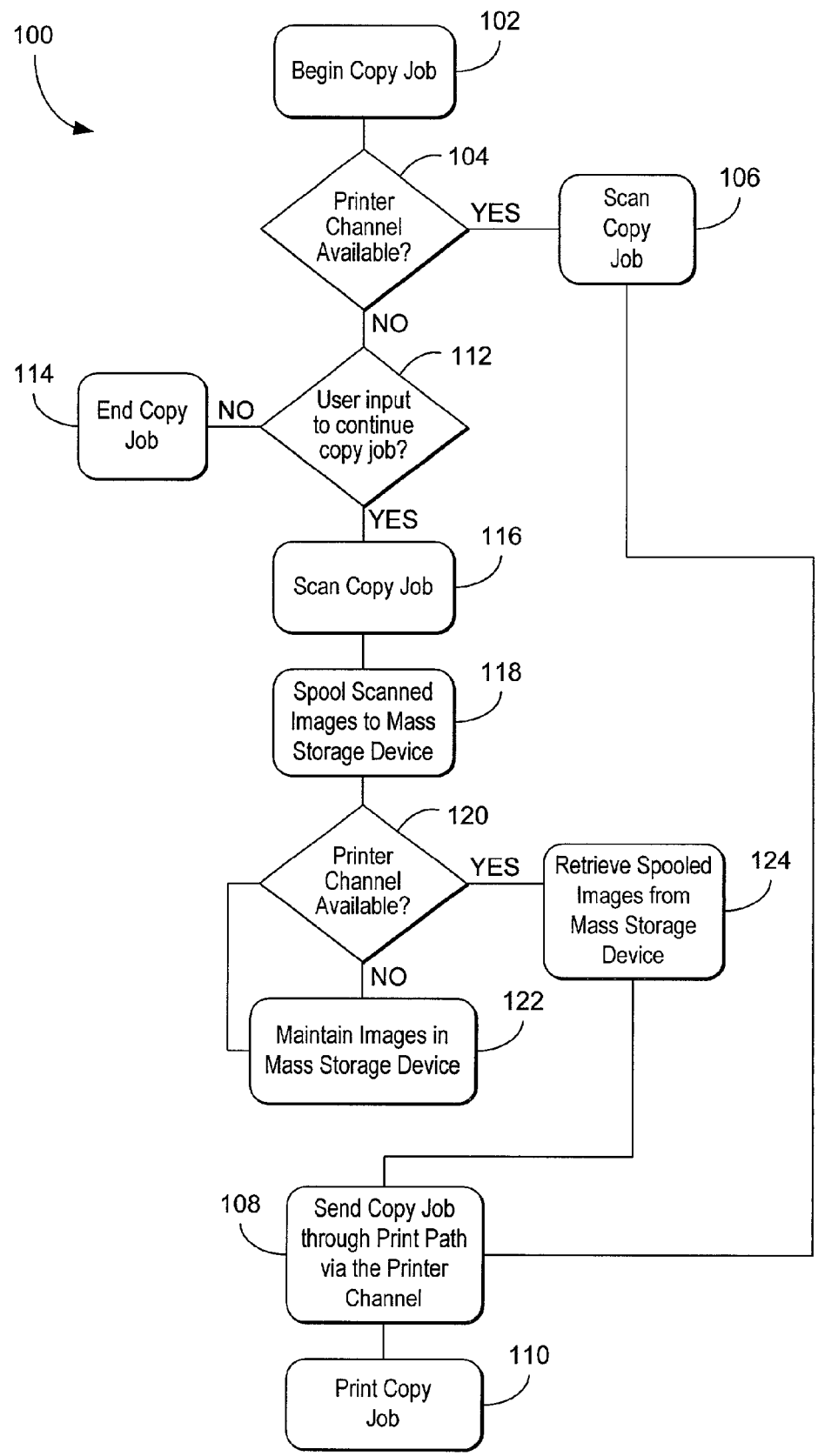
FIG. 4 is a flowchart demonstrating a method of printing a copy job on a document-processing device according to one embodiment of the present invention.

FIG. 4 illustrates a method 100 according to one embodiment of the present invention. Method 100 typically includes a user initiating a job, at 102. As illustrated, the user is initiating a copy job, however, this disclosure may also cover other jobs, including print jobs, scan jobs, etc. The user may initiate the copy job or other job through any suitable method. For example, a user may initiate a copy job by placing the original hard copy document into a media sensor on the device. Alternatively, a user may request that the device begin copying through a control panel. After a user initiates a copy job, the method then typically includes determining whether a printer job channel is available, as shown at 104. A printer job channel may be available if the printer is not otherwise engaged in a prior print job or copy job. If a printer job channel is available, the copy job is scanned at 106, and sent via the available printer job channel through the print path, as shown at 108. The copy job is then printed at 110.

Alternatively, if the printer job channel is not available (the printer is printing a previously sent print job or copy job), then the user input may be requested as to whether the user would like to continue with the copy job, as shown at 112. If the user does not want to proceed with the copy job, the user may terminate the copy job at 114. If the user would like to proceed with the copy job, even though the printer job channel is not available, the copy job may be scanned by a scanner, at 116. In another embodiment, the copy job may be scanned without requesting any user input.

The method further includes spooling the scanned images of the copy job to a mass storage device, at 118. The entire copy job may be stored within the mass storage device. The status of the printer job channel and whether it is available, as shown at 120, effects the length of time the scanned images remain in the mass storage device. As long as the printer job channel is not available, the stored images are maintained in the mass storage device, at 122.

The method further includes periodically polling the printer job channel to review whether a printer job channel is available. When the printer job channel becomes available and the printer is ready to print the copy job, the spooled images are retrieved from the mass storage device, at 124. The images are then sent via the available printer job channel through the print path at 108 and the copy job is printed at 110.

The device and method, described above, allow a walk-up user to immediately begin scanning their copy job, regardless of the status of the printer. Hence, a user with a large copy job will not have to wait for the printer to complete other jobs before the user can start their copy job. The size of the copy job should not be a prohibitive factor in operation of the device and method since the copy job may be spooled to a mass storage device which is capable of storing large amounts of data.

While the present invention has been particularly shown and described with reference to the foregoing preferred embodiments, those skilled in the art will understand that many variations may be made therein without departing from the spirit and scope of the invention as defined in the following claims. The description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

We claim:

1. A method of scanning a job on a document-processing device when a print path is not available, the device having a printer job channel, the method comprising:
   upon initiating a job, determining that a printer job channel is not available;
   scanning the job;
   spooling the job to a mass storage device; and
   storing the job in the mass storage device until the printer job channel becomes available.

2. The method of claim 1, wherein initiating a job includes user input on a control panel on the device.

3. The method of claim 1, wherein initiating a job includes triggering a media sensor on the device.

4. A method of scanning a job on a document-processing device when a print path is not available, the device having
   a. printer job channel, the method comprising:
      determining that a printer job channel is not available;
      requesting user input selecting whether to proceed with the job; and
      upon receiving user input electing to proceed, scanning the job, spooling the job to a mass storage device, and storing the job in the mass storage device until the printer job channel becomes available.

5. The method of claim 1, wherein spooling the job to a mass storage device includes storing the job as a data file.

6. The method of claim 1, wherein the mass storage device is a volatile memory.

7. The method of claim 1, wherein the mass storage device Is a non-volatile memory.

8. The method of claim 1, further comprising:
   periodically checking the status of the printer job channel to review whether the printer job channel becomes available; and
   upon determining that the printer job channel becomes available, retrieving the job automatically from the mass storage device and printing the job.

9. The method of claim 8, wherein printing the job includes sending the copy job through a print engine via the available printer job channel.

10. A document-processing device which is configured to concurrently scan a first job and print a second job, the device comprising:
    a copy module configured to scan a first job to produce scanned images of the first job,
    a mass storage device coupled with the copy module; and
    a printer module coupled with the copy module, the printer module having a controller configured to temporarily direct the scanned images to the mass storage device when the printer module is otherwise engaged.

11. The device of claim 10, wherein the mass storage device is integral with the printer module.

12. The device of claim 10, wherein the mass storage device is integral with the copy module.

13. The device of claim 10, wherein the controller is further configured to automatically retrieve the scanned images from the mass storage device when the printer module is not otherwise engaged.

14. The device of claim 10, wherein the mass storage device is non-volatile memory.

15. The device of claim 10, wherein the mass storage device is a storage disk.

16. A medium readable by a document-processing device, the medium having embodied therein instructions executable by the document-processing device to perform the steps of:
    determining the availability of a printer job channel;
    directing the scanned images of a job to a mass storage device when the printer job channel is not available;
    retrieving the scanned images of the job from the mass storage device automatically when the printer job channel is available; and
    transferring the scanned images to the available printer job channel for printing.

* * * * *

UNITED STATES PATENT AND TRADEMARK OFFICE
CERTIFICATE OF CORRECTION

PATENT NO. : 7,061,639 B2
APPLICATION NO. : 09/940781
DATED : June 13, 2006
INVENTOR(S) : Theresa L. McGuire et al.

It is certified that error appears in the above-identified patent and that said Letters Patent is hereby corrected as shown below:

In column 8, line 5, in Claim 4, delete "a." and insert -- a --, therefor.

In column 8, line 18, in Claim 7, delete "Is" and insert -- is --, therefor.

In column 8, line 19, in Claim 8, delete "claim 1,further" and
insert -- claim 1, further --, therefor.

Signed and Sealed this

Twenty-sixth Day of May, 2009

JOHN DOLL
*Acting Director of the United States Patent and Trademark Office*